Dec. 4, 1945. S. M. SHOBERT 2,390,129
CASTING APPARATUS AND METHOD
Filed June 4, 1943
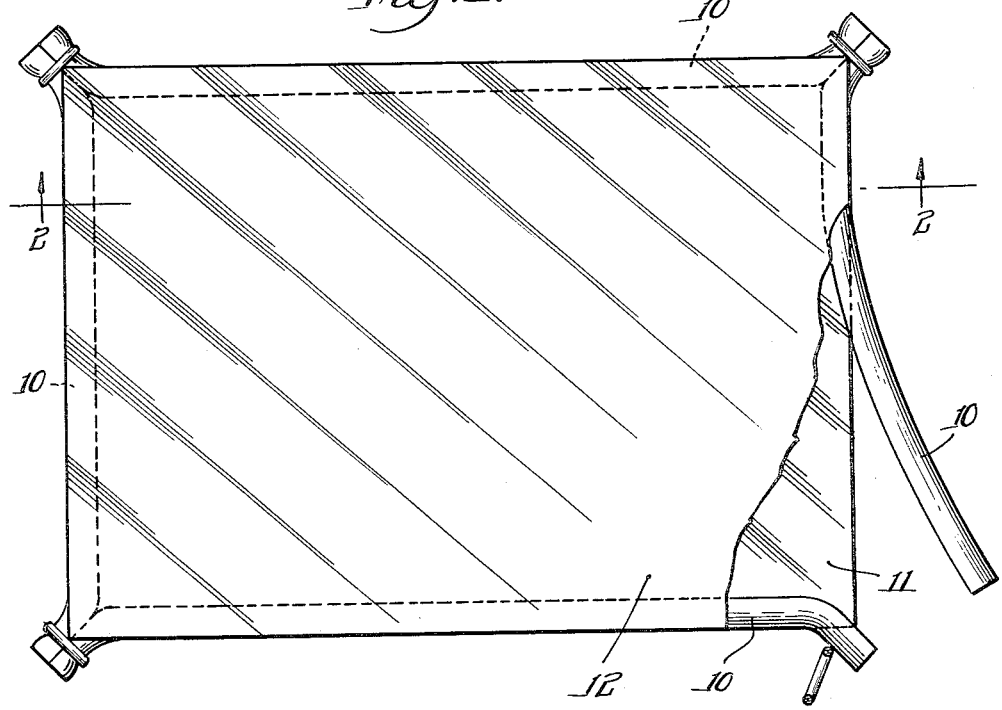
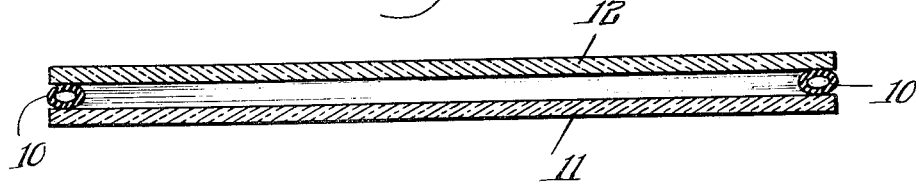
INVENTOR.
Samuel M. Shobert
BY
Schneider & Dressler
Attys Patented Dec. 4, 1945

2,390,129

UNITED STATES PATENT OFFICE 2,390,129

CASTING APPARATUS AND METHOD

Samuel M. Shobert, Flourtown, Pa., assignor, by mesne assignments, to Marco Chemicals, Inc., Sewaren, Pa., a corporation of New Jersey Application June 4, 1943, Serial No. 489,702

9 Claims. (Cl. 18—39)

This invention is directed to a novel method of cast polymerization. It is known to prepare cast polymerization products by introducing a liquid polymerizable material into a cell which comprises a pair of glass sheets separated by a compressible gasket of rubber, polyvinyl chloride, etc. While this process is suitable for polymerization of certain types of materials, it is often observed that cracked sheet or sheets containing unsightly release marks are obtained by this method. The problem has been particularly acute in the polymerization of compounds containing two or more unsaturated polymerizable groups. In such cases the shrinkage which occurs is substantial and the casting often pulls away from the cell wall during polymerization, thus causing "release marks" to be developed in the casting surface. Since these polymers are of a thermosetting character, these marks cannot be pressed out after polymerization is completed.

In an effort to avoid these difficulties various methods have been tried. For example, one method proposed has involved the application of pressure upon the plates comprising the cell walls in a manner such that the plates follow the polymer as it shrinks and remain in contact therewith throughout the polymerization, thus preventing or minimizing formation of release marks or fractures. In such a process clamps are mounted about the edges of the cell and tightened periodically to follow the shrinkage. This process is objectionable since it requires repeated examination of the casting and repeated tightening of the clamps. Use of spring clamps applying a uniform pressure has been found unsuitable since they crush the polymer and cause fractures.

In accordance with the present invention I have been able to avoid these difficulties in a simple manner. I have found that release marks and fractures may be substantially minimized by conducting the polymerization under conditions such that the back pressure, which holds the walls apart and which is established by the gasket or separator, is released or substantially reduced after the polymerizing composition has been polymerized to a solid gel or at least after a polymer of low fluidity incapable of flowing out of the cell is formed, but before release marks are formed to a substantial degree. Thereby any pressure upon the cell walls is transmitted wholly or substantially wholly to the gel. Moreover any tendency of the gasket or separator to prevent the cell walls from following the shrinkage is substantially reduced.

The drawing illustrates the construction of a preferred cell involving my invention which may be used in practicing the method of my invention.

Figure 1 is a top plan view of the cell, except for the conventional assembly clamps, showing how inflated rubber tubes are placed between the rigid cell walls to form the cell, and also showing the free end of one of the tubes unclamped for filling the cell;

Fig. 2 is a cross-section thereof, taken along the line 2—2.

The process may be conducted by various means. For example, a cell may be constructed by placing inflated tubes 10 of rubber or synthetic rubber or rubber-like material containing air or other fluid, and closed at both ends, around the marginal edges of a glass sheet 11 and placing a second glass plate 12 upon the tubes whereby a cell in which the top, bottom and end walls comprise the rubber tubes and the glass plates comprise the side walls. This assemblage may then be clamped together by suitable means such as by means of C-clamps or spring clamps spaced along the edges of the cell adjacent the tubes and tightened to apply pressure to the plate directly above the tubes thereby establishing some degree of pressure within the closed tubes due to compression of the fluid. The cell may then be filled with a suitable polymerizable material such as diallyl maleate or other material in accordance with conventional procedures, and then heated. After polymerization has proceeded to a point such that a solid gel capable of withstanding some pressure is formed, the rubber tubes are opened thereby releasing the pressure therein and causing them to collapse. Thereupon any force tending to urge the cell walls together is supported by the gel rather than by the tubes and the walls are free to follow the shrinkage occurring during further polymerization without interference by the tubes.

Thus it will be apparent that before air is released from the rubber tubes any pressure applied to the cell is taken up largely by the tubes and only to a minor degree by the gel itself. If this pressure is maintained the tubes deform or compress to some degree and thereafter no longer deform unless the pressure is increased. In consequence upon further shrinkage of the gel the cell walls are held apart and the gel is pulled, one or both cell walls causing release marks or fractures. By substantially decreasing the back pressure of the tubes through release of the pressure within the tubes after a gel of some strength has been formed, the walls are permitted to follow the shrinkage as described.

In many cases it is found desirable to apply pressure to the cell walls after the back pressure has been released or reduced in the rubber tubes in order to prevent the polymer from detaching itself from the walls. This may be accomplished by use of C-clamps which may be periodically tightened during polymerization or by spring clamps capable of maintaining a substantially uniform pressure upon the plates. Alternatively, the cell may be laid horizontally and the upper cell wall permitted to rest upon the polymer thereby imparting pressure thereto. Weights may be rested upon the cell in order to increase this pressure if necessary.

The process which involves an essential release of the back pressure of the tubes after the polymer has gelled or has thickened to a degree such that it will not flow out of the cell to an objectionable degree is capable of numerous variations. For example, a substantial pressure may be established within the rubber tubes serving as the gasket between the glass plates and the cell filled and polymerized. Later the pressure within the cell may be decreased sufficiently to transmit any tendency of the cell walls to move toward each other to the polymer rather than the gel.

The time at which back pressure exerted by the gasket may be released or reduced is dependent upon the nature of the compound or composition undergoing polymerization, whether the composition introduced into the cell is monomer or a syrupy polymer, the length and temperatures of the curing cycle, the thickness of the casting as well as upon other factors. For this reason no hard and fast rule may be laid down and the time must be ascertained for each compound treated by preliminary experiment to determine the period in the cycle when the polymer tends to pull away from the cell wall or when the polymer thickens to a point where leakage from the cell will not occur upon partial or complete release of the pressure within the gasket. If the pressure within the tubular gaskets is released too early, the polymer may be crushed or monomer or syrupy polymer may leak out of the cell. On the other hand, if the pressure is released too late, release marks or even fractures may develop. Thus, the pressure should be released after the polymer has solidified to an extent that it may support some pressure (for example, 0.5 lb. per sq. in.) without fracture or at least after the material has thickened to an extent such that it will not leak from the cell but before the polymer pulls away to an objectionable degree from the cell walls and before substantial formation of release marks has occurred.

In dealing with polymerization of liquid compositions which contain two or more unsaturated polymerizable groups in a molecule, the polymerization proceeds through a stage in which gradual thickening occurs and thereafter sets up to a solid gel. In the initial stages this gel comprises a solid mixture of liquid polymerizable monomer, soluble fusible solid polymer, and a portion of a polymer which is insoluble or difficultly soluble in usual solvents. Often the polymerization may be carried to the point where the polymer contains 15 to 50 per cent of the insoluble polymer before the pressure is released from the tubular gaskets.

The temperature at which polymerization may be carried out depends largely upon the nature of the polymerizable composition and the peroxide used. For example, using benzoyl peroxide as the catalyst temperatures ranging between 50 to 115° C. are normally utilized. With ketone peroxides, such as acetone peroxide or methyl ethyl ketone peroxide, the temperature utilized is higher. With isopropyl peroxycarbonate the temperature is lower. Ultraviolet or infrared light may be used as an aid to polymerization and in such cases catalysts and external heating methods may be dispensed with in some cases.

The walls of the cell may be of various convenient materials such as glass plates, aluminum or other metallic sheeting, plaster of Paris, synthetic resin sheets, etc. Generally these walls should possess sufficient rigidity to be capable of retaining a shape imparted thereto, whereby a more or less uniform compacting occurs upon evacuation of the cell and the walls move toward each other, at least partially, by reason of compression of the gasket. Flat or curved sheets may be prepared through use of flat or curved molds or walls having the contour of the desired product whereby the sheet takes the form of the mold.

The gasket may be of rubber, synthetic rubber, metal or other material, preferably elastic in character, capable of forming an air-tight seal between the molds and capable of being compressed to permit movement of the cell walls toward each other when a pressure is applied to the walls of the cell. The gasket may be of any construction adapted to permit easy release of the back pressure exerted by it against the cell walls. Thus it may be of rubber tubing as previously explained. Alternatively, it may possess a U or V cross-section with the legs of the U projecting outwardly from the cell. In such a case the back pressure of the gasket may be released or reduced simply by pressing the legs of the U together whereby the gasket is pulled away from the cell. Numerous other methods of accomplishing this result will be apparent to those skilled in the art.

The invention may be applied to the polymerization of various polymerizable unsaturated compounds or compositions. It is particularly effective when used in conjunction with polymerizable compounds containing two or more unsaturated unconjugated polymerizable groups. This includes the following:

1. Unsaturated alcohol esters of unsaturated acids such as the esters of vinyl, allyl, methallyl, 2 chloroallyl, crotyl, beta ethyl allyl, propargyl, methyl propargyl, oleyl, linoleyl, ricinoleyl, linallyl, phenyl propargyl or cinnamyl alcohol and unsaturated acids such as acrylic, methacrylic, alpha or beta chloracrylic, crotonic or cinnamic acids such as allyl acrylate, allyl alpha chloracrylate, etc.

2. Unsaturated alcohol polyesters of polybasic acid such as phthalic, carbonic, oxalic, succinic, adipic, azalaic, sebacic and terephthalic acids including diallyl carbonate, diallyl maleate, diallyl fumarate, diallyl oxalate, diallyl adipate, dialyl itaconate, diallyl succinate, ethylene glycol bis (allyl carbonate) diethylene glycol bis (allyl carbonate) and mixtures thereof or the corresponding esters of methallyl 2 chloroallyl or similar polymerizable unsaturated alcohols.

3. Polyhydric alcohol polyesters of the above unsaturated acids and polyhydric alcohols such as ethylene glycol, triethylene glycol, hexaethylene glycol, glycerol, sorbitol, mannitol, erythritol, polyvinyl alcohol or cellulose esters such as ethylene glycol diacrylate, ethylene glycol dimethacrylate, etc.

4. Polyhydric alcohol polyesters of polybasic acids including esters of polyhydric alcohols and maleic, fumaric, itaconic or citraconic acid. Such esters may include alkyd type of glycol maleates or fumarates or corresponding mixed esters derived from both monohydric and polyhydric alcohols such as ethylene glycol bis (methyl fumarate), ethylene glycol bis (ethyl fumarate), etc.

5. Ethers including divinyl ether and copolymers of the ethers and any of the above compounds.

6. Other organic compounds including divinyl benzene, divinyl naphthalene, vinyl acetylene, divinyl acetylene, etc.

In addition, the process may be applied to the treatment of other unsaturated compounds such as vinyl acetate, methyl acrylate, acrylonitrile, methyl methacrylate, ethyl methacrylate, butyl methacrylate, styrene, vinyl chloride, vinylidine chloride, methyl itaconate, methyl fumarate, methyl alpha chloracrylate, etc. or to copolymers thereof with the above polyfunctional materials.

The following examples are illustrative:

Example 1

A cell was prepared by placing rubber tubes, ⅛″ outside diameter, which were coated with polyvinyl alcohol and closed at both ends, along the marginal edges of a tempered glass plate 16″ sq., placing a second tempered glass plate upon the rubber tubes and clamping the assemblage together by means of pressure spring clamps. Thereby, a cell was formed with the rubber tubes serving as a gasket or separator between the plates and forming a substantially liquid-tight container and the pressure upon the tubing established a gas pressure within the tubes.

Twenty moles of maleic anhydride and 20 moles of diethylene glycol were placed in a flask and heated at a temperature of 180 to 212° C. for about 12 hours and a resin having an acid number of 45.2 was obtained. During the reaction carbon dioxide was bubbled through the reaction mixture and the mixture was continuously agitated.

523 grams of the diethylene glycol maleate alkyd thus prepared was heated under reflux with 56 grams of normal propanol for 9.5 hrs., the temperature gradually rising to about 150° C. and the mixture was topped under a pressure of 10 mm. at 180–200° C.

Fifty per cent of the propanol was taken up by the compound. The resulting product was a yellow polymerizable liquid which was more fluid than the product of Example 1 and which had an acid number of 25.4.

A quantity of the material obtained by treatment of the alkyd with propyl alcohol was heated with 15 per cent by weight of acetic anhydride at 120–130° C. for several hours. The composition was then topped at 10 min. pressure and a temperature of 180° C. and a liquid having a viscosity about the same as that of the propylized alkyd was secured.

A composition consisting of 40 per cent styrene and 60 per cent by weight of the propylized, acetylated derivative of diethylene glycol maleic acid alkyd and containing 3 per cent by weight of benzoyl peroxide dissolved therein was prepared. The cell was filled with this composition and cured according to the following cycle:

| | ° C. |
|---|---|
| 15 minutes @ | 70 |
| 30 minutes @ | 75 |
| 30 minutes @ | 80 |
| 30 minutes @ | 85 |
| 15 minutes @ | 115 |

The constricted ends of the rubber tube gaskets were opened and the casting pressure was transmitted from the gaskets to the casting after the heating cycle had run for 15 minutes.

Example 2

A cell prepared as in Example 1 was filled with a mixture of 40 per cent by weight of diallyl adipate and 60 per cent by weight of diallyl phthalate, the mixture containing 3 per cent by weight of benzoyl peroxide. The cell was heated at 65° C. for 20 hours. Thereupon the ends of the rubber tubes were opened and the casting cured according to the following cycle a polymer free from release marks being obtained:

| | ° C. |
|---|---|
| 2 hours @ | 70 |
| 1 hour @ | 75 |
| 1 hour @ | 80 |
| 1 hour @ | 85 |
| 1 hour @ | 95 |
| 2 hours @ | 115 |

Example 3

The cell of Example 1 was filled with diallyl maleate containing 2 per cent benzoyl peroxide and heated for 20 hours at 60° C. Thereupon the ends of the rubber tubes were opened and heating continued according to the cycle of Example 2 a polymer free from release marks being secured.

Although the invention has been described with particular reference to the specific details of certain embodiments thereof, it is not intended that such details be regarded as limitation upon the scope of the invention except insofar as included in the accompanying claims.

I claim:

1. A method which comprises polymerizing an unsaturated polymerizable composition in a cell comprising a pair of cell walls separated by a hollow, fluid-tight gasket containing a fluid under pressure, the walls being clamped together, releasing the pressure in the gasket after a solid polymer has been formed at least to a degree sufficient to permit more free movement of the walls as the polymer shrinks and continuing polymerization while pressing the walls together to cause the walls to follow the shrinkage and remain in contact with the polymer.

2. A method which comprises polymerizing a liquid polymerizable material in a cell comprising a pair of cell walls separated by a hollow fluid-tight separator containing a fluid under pressure, the assemblage forming a cell capable of retaining polymerizable liquid during polymerization, reducing the pressure within the separator after a polymer of low fluidity has been formed and continuing polymerization.

3. The process of claim 2 wherein the pressure is reduced after the polymer has become solid but before substantial formation of release marks occurs.

4. The process of claim 2 wherein the pressure is reduced before the polymer fractures.

5. A method which comprises polymerizing a liquid polymerizable material in a cell comprising a pair of cell walls separated by a hollow fluid-tight separator containing a fluid under pressure, the assemblage forming a cell capable of retaining polymerizable liquid during polymerization, reducing the pressure within the separator after a polymer of low fluidity has been formed and continuing polymerization while pressing the walls together to cause the walls to follow the shrinkage and remain in contact with the polymer for a further period of polymerization.

6. A method which comprises polymerizing a polymerizable material in a cell comprising a pair of walls separated by a hollow fluid-tight separator containing a fluid under pressure, continuing polymerization whereby substantial shrinkage occurs, and reducing the pressure in the separator after substantial polymerization has taken place but before substantial formation of fractures has occurred.

7. A method which comprises polymerizing a polymerizable liquid in a cell which comprises a pair of walls separated by a hollow fluid-tight separator containing a fluid under pressure, reducing the pressure within the separator after a polymer of low fluidity has been formed and continuing polymerization.

8. The process of claim 7 wherein the pressure is reduced before substantial formation of release marks takes place.

9. A casting cell for casting a polymerizable liquid material comprising top and bottom cell walls of rigid material, fluid-tight, collapsible tubing containing fluid under pressure separating said walls and forming the side walls of said cell, and means for releasing said fluid.

SAMUEL M. SHOBERT.